United States Patent
Brown et al.

(10) Patent No.: US 7,095,842 B2
(45) Date of Patent: Aug. 22, 2006

(54) ENABLING CALLER CONTROLLED HOLD QUEUE POSITION ADJUSTMENT

(75) Inventors: Michael Wayne Brown, Georgetown, TX (US); David R. Cheng, Wilmington, DE (US); Wing-Ying Stephanie Leung, Ann Arbor, MI (US); Folu Okunseinde, Oakhurst, NJ (US); Michael A. Paolini, Austin, TX (US); Seema Sheth-Voss, Cambridge, MA (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/004,664

(22) Filed: Dec. 3, 2001

(65) Prior Publication Data

US 2003/0103619 A1    Jun. 5, 2003

(51) Int. Cl.
  *H04M 3/00* (2006.01)
  *H04M 5/00* (2006.01)
(52) U.S. Cl. .............. 379/266.01; 379/266.02
(58) Field of Classification Search .......... 379/266.01, 379/265.02, 266.03, 93.13, 92.01, 266.02
See application file for complete search history.

(56) References Cited

U.S. PATENT DOCUMENTS

| | | | |
|---|---|---|---|
| 4,266,098 A | 5/1981 | Novak | 379/77 |
| 4,953,204 A | 8/1990 | Cuschleg et al. | 379/266.05 |
| 5,303,042 A | 4/1994 | Lewis et al. | 348/14 |
| 5,724,408 A | 3/1998 | Morganstein | 379/88.2 |
| 5,802,526 A | 9/1998 | Fawcett et al. | 707/104.1 |
| 5,806,045 A | 9/1998 | Biorge et al. | 705/14 |
| 5,828,735 A | 10/1998 | Farfan | 379/93.13 |
| 5,872,841 A | 2/1999 | King et al. | 379/210.01 |
| 5,875,231 A | 2/1999 | Farfan et al. | |
| 5,889,845 A | 3/1999 | Staples et al. | 379/211.02 |
| 5,933,828 A | 8/1999 | Eitel et al. | 707/10 |
| 5,937,044 A | 8/1999 | Kim | |
| 5,946,378 A | 8/1999 | Farfan | 379/88.23 |
| 5,946,388 A | 8/1999 | Walker et al. | 379/266 |
| 5,956,024 A | 9/1999 | Strickland et al. | 345/717 |
| 5,978,467 A | 11/1999 | Walker et al. | 379/266.01 |
| 6,014,439 A | 1/2000 | Walker et al. | 379/266.01 |
| 6,028,917 A | 2/2000 | Creamer et al. | 379/100.01 |
| 6,046,762 A | 4/2000 | Sonesh et al. | 348/14.11 |
| 6,088,444 A * | 7/2000 | Walker et al. | 379/266.02 |
| 6,125,178 A | 9/2000 | Walker et al. | 379/266 |

(Continued)

FOREIGN PATENT DOCUMENTS

WO    WO 98/35507    8/1998

OTHER PUBLICATIONS

U.S. Appl. No. 10/005,733.

(Continued)

*Primary Examiner*—Wing Chan
*Assistant Examiner*—Thjuan P. Knowlin
(74) *Attorney, Agent, or Firm*—Mark S. Walker; Amy J. Pattillo

(57) ABSTRACT

A method, system, and program for allowing callers to adjust in position within a call hold queue are provided. An advancement token earned by a caller is detected at a calling queue. The position of the caller within the calling queue is adjusted, in response to redemption of the advancement token, such that the caller is allowed control over the position within the calling queue by earning advancement tokens. In particular, a caller may earn advancement tokens by participation in competitions or surveys or by redemption of membership points.

53 Claims, 8 Drawing Sheets

U.S. PATENT DOCUMENTS

| | | | |
|---|---|---|---|
| 6,151,387 A | 11/2000 | Katz | 379/93.13 |
| 6,178,240 B1 * | 1/2001 | Walker et al. | 379/266.01 |
| 6,208,729 B1 | 3/2001 | Agraharam et al. | 379/266 |
| 6,222,920 B1 * | 4/2001 | Walker et al. | 379/266.01 |
| 6,310,952 B1 * | 10/2001 | Baldwin et al. | 379/266.01 |
| 6,327,346 B1 | 12/2001 | Infosino | 379/88.02 |
| 6,349,132 B1 | 2/2002 | Wesemann et al. | 379/88.17 |
| 6,381,316 B1 | 4/2002 | Joyce et al. | 379/114.2 |
| 6,404,873 B1 | 6/2002 | Beyda et al. | 379/202.01 |
| 6,502,745 B1 | 1/2003 | Stimson et al. | |
| 6,522,743 B1 | 2/2003 | Hurd | 379/266.04 |
| 6,539,080 B1 | 3/2003 | Bruce et al. | 379/88.17 |
| 6,606,596 B1 | 8/2003 | Zirngibl et al. | 704/270 |
| 6,639,982 B1 | 10/2003 | Stuart et al. | 379/266.03 |
| 6,658,093 B1 | 12/2003 | Langseth et al. | 379/88.17 |
| 6,665,395 B1 * | 12/2003 | Busey et al. | 379/265.09 |
| 6,711,249 B1 | 3/2004 | Weissman et al. | 379/221.06 |
| 6,724,866 B1 | 4/2004 | Kuhn et al. | 379/88.21 |
| 6,738,473 B1 * | 5/2004 | Burg et al. | 379/266.01 |
| 6,826,173 B1 | 11/2004 | Kung et al. | |
| 2002/0046030 A1 | 4/2002 | Haritsa et al. | 704/256 |
| 2002/0055967 A1 | 5/2002 | Coussement | 709/202 |
| 2002/0055975 A1 | 5/2002 | Petrovykh | 709/205 |
| 2002/0131399 A1 * | 9/2002 | Philonenko | 370/351 |
| 2002/0164000 A1 | 11/2002 | Cohen et al. | 379/88.17 |
| 2002/0196927 A1 * | 12/2002 | Johnson et al. | 379/265.02 |
| 2003/0031309 A1 | 2/2003 | Rupe et al. | 379/265.02 |
| 2003/0053615 A1 | 3/2003 | Anderson et al. | 379/265.09 |
| 2003/0103617 A1 | 6/2003 | Brown et al. | 379/265.02 |
| 2003/0103618 A1 | 6/2003 | Brown et al. | 379/265.09 |
| 2003/0103620 A1 | 6/2003 | Brown et al. | 379/266.01 |
| 2003/0103621 A1 | 6/2003 | Brown et al. | 704/9 |
| 2003/0108185 A1 | 6/2003 | Brown et al. | 379/266.01 |
| 2004/0057569 A1 | 3/2004 | Busey et al. | 379/265.09 |

OTHER PUBLICATIONS

U.S. Appl. No. 10/005,680.
U.S. Appl. No. 10/006,004.
U.S. Appl. No. 10/005,828.

* cited by examiner

ENABLING CALLER CONTROLLED HOLD QUEUE POSITION ADJUSTMENT

CROSS-REFERENCE TO RELATED APPLICATIONS

The present application is related to the following applications, incorporated herein by reference:

(1) U.S. Pat. No. 6,826,276, filed Dec. 3, 2001, issued Nov. 30, 2004, titled "Managing Caller Profiles Across Multiple Call Hold Centers";

(2) U.S. patent application Ser. No. 10/005,680;

(3) U.S. patent application Ser. No. 10/006,004; and (4) U.S. patent application Ser. No. 10/005,828.

BACKGROUND OF THE INVENTION

1. Technical Field

The present invention relates in general to telecommunications and, in particular, to managing a caller's position in a hold queue. Still more particularly, the present invention relates to enabling callers to adjust in position within a hold queue.

2. Description of the Related Art

Many companies provide telephone-based access to help staff, sales personnel, representatives, and automated menus. Where high telephone call traffic is typical in telephone access to a company's representatives, automatic call distribution systems (ACDs) are often employed within call center operations to provide an even and systematic distribution of incoming calls to multiple representatives. ACDs typically provide incoming calls with a direct connection to an available representative until all representatives are busy. Then, once all representatives are waiting on customers, calling parties are placed in a hold queue, and selectively connected to a representative once a representative comes available.

In general, when a caller is placed in a hold queue, the caller's queue position is dependent upon the receipt time of the call at the vendor location. Some companies utilize call center systems that sort callers into multiple queues according to selection criteria that a caller enters. For example, a user may select from a menu of five possible types of information the caller would like to receive, such that the caller is placed in one of five hold queues. However, ultimately, the caller's queue position within one of the five hold queues is dependent upon the time at which the caller makes a menu selection.

According to one example, a call processing apparatus may designate the position of a call within the queue in accordance with the potential economic value of the call. However, the call processing apparatus is limited in that each caller's position within the hold queue is adjusted in a manner that is hidden from the caller, allowing only the company to maintain control in the position of a caller within a hold queue.

According to another example, a caller may be enabled to change the caller's position within a hold queue by making a payment to the hold queue service. A caller may enter a credit card number or account number from which a charge for advancing in the hold queue is charged. While the call processing apparatus grants a caller control over the caller's position within a hold queue, the call processing apparatus is limited in that the control is given in exchange for the company receiving a direct economic benefit from adjusting the position of the caller within a hold queue.

Many companies utilize the time that a caller is waiting in hold call queue to broadcast over the telephone line. For example, a company may subscribe to or implement an ACD that plays music or advertising while callers wait in the hold queue. In addition, the ACD may verbally alert the caller to the amount of time estimated before a representative will be available, the position of the caller in the hold queue, and other information that will assure the caller of a changing position in the hold queue.

While call queuing provides advantages over a consumer retrying a call in response to a busy signal, ultimately call queuing may cause frustration and ill will of consumers towards a company, particularly where excessively long waits, full queues and accidental disconnects are encountered. Allowing consumers to feel some control over a position within the call queue without requiring the consumer to pay for the control would be advantageous in alleviating such frustrations.

In view of the foregoing, it would be advantageous to provide a hold queue system that allows a caller to control the caller's position within a hold queue independent of the receipt time of the call. For example, it would be advantageous to provide a hold queue system that allows callers to adjust a position within a hold queue by competing in a game or other competition between callers. In another example, it would be advantageous to provide a hold queue system that grants advancement in the call queue according to caller participation in a survey on-line or via the telephone before, during, or after the call. Further, it would be advantageous to provide a hold queue system that allows a caller to redeem membership points in exchange for an adjustment of a position within a hold queue.

SUMMARY OF THE INVENTION

In view of the foregoing, it is therefore an object of the present invention to provide an improved telecommunications system.

It is another object of the present invention to provide a method, system and program for managing a caller's position in a hold queue.

It is yet another object of the present invention to provide a method, system and program for enabling callers to adjust in position within a hold queue.

According to one aspect of the present invention, an advancement token earned by a caller is detected at a calling queue. The position of the caller within the call hold queue is adjusted, in response to redemption of the advancement token, such that the caller is allowed control over the position within the call hold queue by earning advancement tokens.

According to another aspect of the present invention, at least one call transferred from a call hold queue is received at a token advancement system. A caller of the at least one call is enabled to participate in at least one position adjustment service. Responsive to a result of the caller participation in the at least one position adjustment service, a token for directing adjustment of a position of the at least one call within the call hold queue is transferred to the call hold queue.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A method, system, and program for enabling callers to adjust positions within a call hold queue are provided. In general, a caller is given an opportunity while on hold to participate in actions that may gain the caller an adjustment in position within the call queue in addition to the adjustment in position that is automatically provided as calls are answered from the call hold queue. A caller's position within the call hold queue may be advanced by a single or multiple positions.

In the present embodiment, one method for adjustment of a position within a call hold queue may be performed by redeeming advancement tokens. Therefore, the options for adjustment of position include multiple platforms for earning redeemable advancement tokens.

According to one advantage of the present invention, a caller may earn redeemable advancement tokens while on hold. In particular, a caller may earn redeemable advancement tokens by participating in a competition or survey while on hold.

According to another advantage of the present invention, a caller may earn redeemable advancement tokens independent of an on hold status. In particular, a caller may earn points or other credits through purchases, participation in surveys, and other actions for which a vendor is willing to advance points. The points or other credits are preferably stored in an account that a caller may access while on hold and redeem the points or other credits for advancement tokens.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

The present invention may be executed in a variety of systems, including a variety of computing systems and electronic devices under a number of different operating systems. In one embodiment of the present invention, the call queue management system (e.g. an ACD) is a computer system that incorporates communication features that provide telephony, messaging, and information services to a plurality of callers. In general, the present invention is preferably executed in a computer system that performs computing tasks such as manipulating data in storage that is accessible to the computer system.

Figure 1:
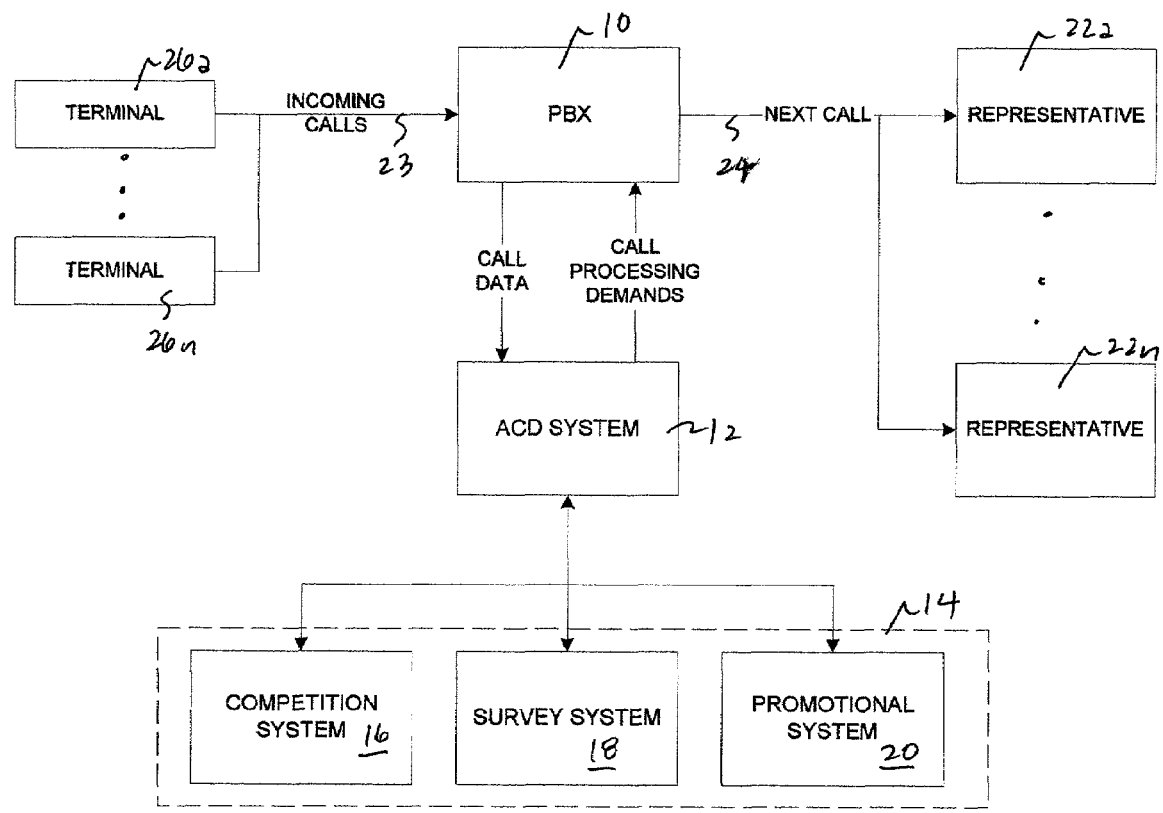
FIG. 1 depicts a block diagram of a network environment for transferring information in accordance with the method, system, and program of the present invention.

With reference now to the figures, and, in particular, with reference now to FIG. 1, there is depicted a block diagram of a network environment for transferring information in accordance with the method, system, and program of the present invention. It will be appreciated by one with skill in the art that although a particular phone queuing network environment is described below, the invention is not limited to use within the described phone queuing network environment, rather, the inventive queue position advancement process may be implemented within any on-hold information service regardless of the telephony environment.

As illustrated, multiple incoming calls are received at a telephone distribution system or call center, such as private branch exchange switch (PBX) 10, for example. PBX 10 receives incoming calls via trunk 23 and is connected to multiple representative terminals 22a–22n via trunk 24. In particular, PBX 10 receives incoming calls via trunk 23 from multiple terminals 26a–26n, wherein terminals 26a–26n may represent, but are not limited to, conventional wireline telephone systems, wireless phones, video phones, personal computers, pervasive computing devices configured with appropriate telephony software and Internet connectivity, telephone stations, other PBXs, or switching systems.

In the description which follows, it will be assumed that all representative terminals 22a–22n are busy and therefore PBX 10 cannot respond to an incoming call by making a direct connection to one of representative terminals 22a–22n. As a result, PBX 10 is forced to place the incoming call on hold. In addition, PBX 10 determines the calling telephone number from caller ID or other methods.

After placing the incoming call on hold, the call and caller ID, time of call, and other information obtained by PBX 10 are forwarded to automatic call distributor (ACD) 12. ACD 12 preferably creates a record based on the call and positions the call within a call queue. While in the present embodiment PBX 10 forwards calls to a single ACD, in alternate embodiments, PBX 10 may forward calls to multiple ACDs. In addition, ACD 12 and other ACDs may be coupled to PBX 10 or may be remotely accessed by PBX 10.

While the call is on hold, an interactive voice response unit (IVRU) within ACD 12 may offer the caller a menu of available options that may be accessed by the caller for adjusting the caller's position within the call queue. In general, IVRU is a voice information system which may be arranged to (i) prompt a caller for specific information by asking questions based on a set of modules in a transactions script, (ii) collect that information by detecting and interpreting dual tone multifrequency (DTMF) signals entered by the caller or by recognized speech input by the caller, (iii) organize the collected information in a specific format and (iv) forward the collected information to be utilized within ACD 12. For purposes of the present invention, the IVRU may also detect pointer selections, touch sensitive selections, and stylus selections. In addition, for purposes of the present invention, a voice browser may be implemented in lieu of an IVRU, as described in U.S. patent application Ser. No. 10/006,004.

Particularly, in the present invention, IVRU preferably follows a transaction script to prompt the caller to select from among multiple available token advancement systems, collects the selection information from the caller, organizes the selection information into a format useable by ACD 12 and forwards the selection information within ACD 12. Then, in response to a caller selection from among the options, the call is transferred to one of token advancement systems 14. In particular, token advancement systems 14 may be associated with a single ACD or may be accessible by multiple ACDs from multiple vendors. In cases where token advancement systems 14 are accessible by multiple vendors, services provided to callers may be distinguished according to vendor.

Token advancement systems 14 include a competition system 16, a survey system 18, and a promotion system 20. Advantageously, a caller may participate through competition system 16 in multiple available games against other callers waiting in the call queue to receive advancement tokens for winning. Alternatively, a caller may participate through survey system 18 in a survey to receive advancement tokens. Further, a caller may access a promotional account with a particular vendor through promotion system 20, wherein credits within the promotional account may be transferred into advancement tokens.

Advancement tokens are preferably a record of the type of token advancement system utilized, the type of action performed by the caller, and any resulting change in position promised by the token advancement system. In addition, other information may be included in an advancement token.

Advancement tokens are preferably transferred from any of token advancement systems 14 to ACD 12 in association with a caller, but independent of whether the call is transferred back to ACD 12. ACD 12 then calculates an adjustment of the position of a call within a queue according to the advancement token. In particular, ACD 12 may include a rating system for advancement tokens for calculating the adjustment in call position.

Alternatively, each of token advancement systems 14 may include a rating system for advancement tokens that calculates the adjustment in position of a call for a vendor. Further, the actual adjustment in position may entail advancing a particular number of positions within the queue or may entail advancing a particular amount of estimated waiting time within the queue.

ACD 12 preferably sends a return request to the token advancement system holding a call either when the call is the next to be answered in the call queue or when the PBX is able to transfer the call to the next representative. The caller is given the option of completing any activities in progress before transfer to a representative. In practice, an IVRU preferably plays a short message to the caller indicating that the call is next in line to be answered.

Figure 2:
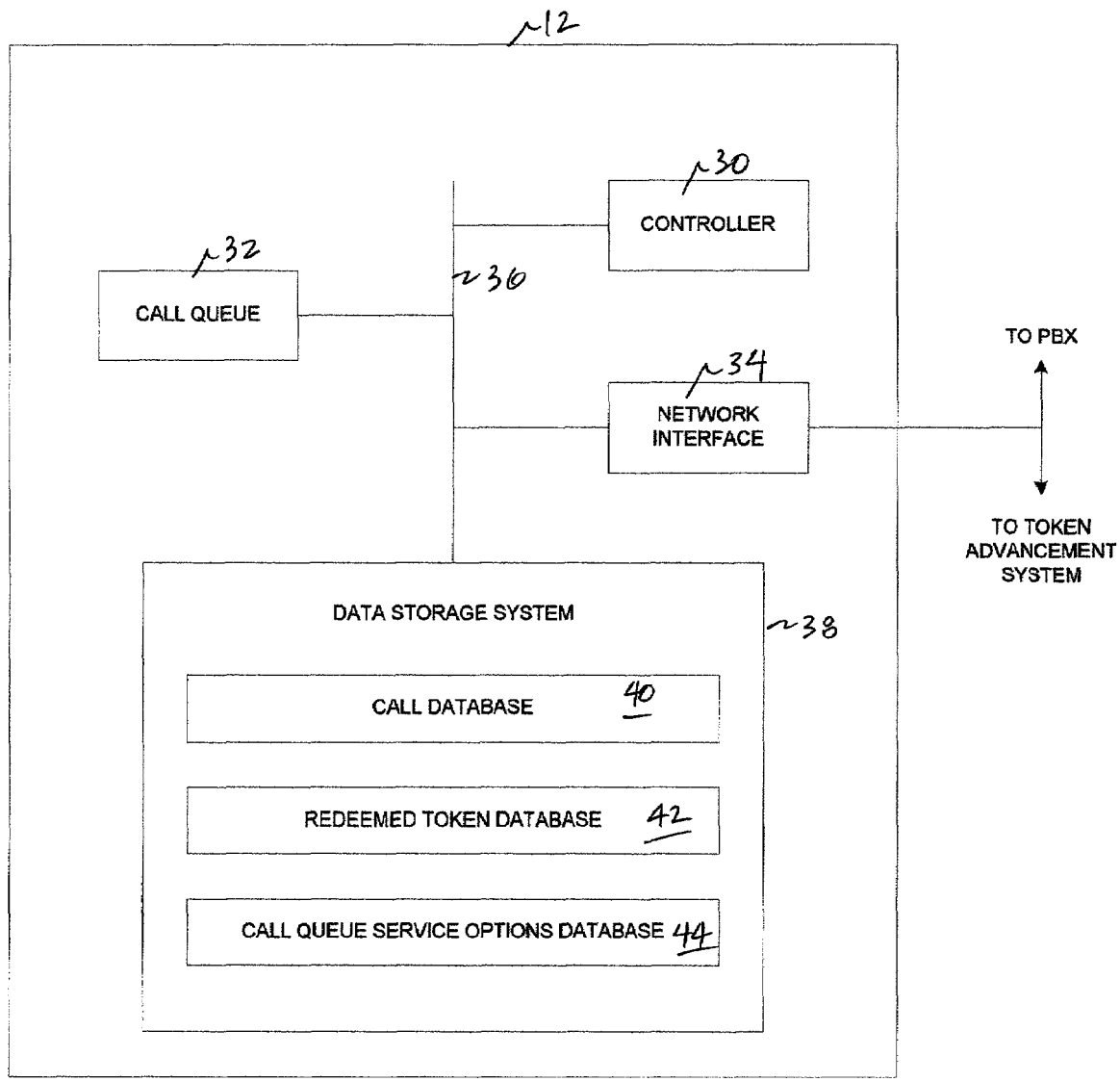
FIG. 2 illustrates a block diagram of an automatic call distribution system (ACD) in accordance with the method, system, and program of the present invention.

Referring now to FIG. 2, there is illustrated a block diagram of an automatic call distribution system (ACD) in accordance with the method, system, and program of the present invention. As illustrated, ACD 12 includes a controller 30, an IVRU 31, a call queue 32, a network interface 34, and a data storage system 38 communicatively connected via a bus 36. Additional systems may be connected along bus 36 that are not depicted herein.

The functions of controller 30 and other controllers described in systems hereafter are described below without reference to the components of controller 30, however controller 30 and other controllers described hereafter preferably include multiple devices. In particular, controller 30 and other controllers described hereafter preferably include, but are not limited to, at least one processor, memory, a data storage system, system software and application software, that function together to perform the functions described with reference to controller 30. In addition, controller 30 and other controllers advantageously include an IVRU or voice browser to prompt the caller to select from a menu of options and to detect caller responses to those options in the form of a keypad, voice, pointer, or stylus entry.

Network interface 34 preferably communicates with PBX 10 and token advancement systems 14 via a telephone network or other networking system. In particular, network interface 34 receives transfers of calls from PBX 10 and then returns calls to PBX 10 when a call is the next in line within call queue 32. In addition, in particular, network interface 34 transfers calls to one of token advancement systems 14 and then receives advancement tokens associated with callers. Further, network interface 34 transfers indicators to token advancement systems 14 that a call is next in line and receives the call back from token advancement systems 14.

Controller 30 preferably detects a new call, stores the call in call queue 32 and initiates the IVRU of controller 30 to control output of the menu of options included in call queue service options database 44 to the caller. A caller may select from multiple service options including, but not limited to, music and information services, third-party calling services, Internet browsing services, and position adjustment services, herein described as token advancement services.

TABLE 1

| Code | Service |
|------|---------|
| #00  | Music/News |
| #01  | Third-party calling |
| #02  | Internet browsing |
| #03  | Position adjustment |

Table 1 above illustrates textual prompts for the automated output of exemplary codes that may be entered by the caller and the corresponding services that may be accessed. For example, #02 may direct controller 30 to connect the caller terminal to a music channel. In another example, #03 may initiate audio automated output of an additional set of selections of the types of position adjustment services available. In addition to entry of codes, a user may provide a voice entry that selects from one of the services where the IVRU of controller 30 utilizes a voice recognition system to match the voice entry with one of the services.

Depending on the service selection selected by each caller, the call is transferred to one of multiple service provision systems. In particular, controller 30 will place the call on hold in order to transfer the call via network interface to a service provision system. As previously described, according to a preferred embodiment of the present invention, a caller may select a token advancement service, wherein the call the transferred to one of multiple available token advancement systems.

TABLE 2

| Phone No. | Call Tracking No. | Q Position | Current System |
| --- | --- | --- | --- |
| 5120001111 | 1010 | 7 | Competition |
| 5120002222 | 1012 | 4 | Competition |

Table 2 depicts an example of a portion of a call database 40 within data storage system 38. Advantageously, upon receipt of a new call, controller 30 adds an entry to call database 40 indicating the phone number, tracking number, and current call queue position of the call. As a call changes in position within the call queue, the position is also updated within call database 40. In addition, the current system processing a call is preferably recorded. For example, the competition system is currently processing the two calls recorded. Further, additional categories of data may be included within call database 40 such as the time the time each call is received, the total time waiting, the identity of the caller, and other information which enables ACD 12 to better handle manage each call.

TABLE 3

| Call Track | TA System | Action | Promised | Result |
| --- | --- | --- | --- | --- |
| 1010 | Competition | v 1012-won | 1 Position | Advance 1 |
| 1012 | Competition | v 1010-lost | 1 Position | Decrease 1 |

Table 3 illustrates an example of a portion of a redeemed token database 42 within data storage system 38. Advantageously, callers may earn advancement tokens from token advancement systems 14. The advancement tokens for a caller may be received at ACD 12 while the call continues to be processed by token advancement systems 14. Controller 30 adds an entry to redeemed token database 42 indicating the call tracking number, type of token advancement system from which the token is earned, the action taken by the caller, the promised result by the token advancement system 14, and the queue position result in ACD 12.

In particular, controller 30 detects the advancement token and adjusts the position of at least one caller according to the advancement token. However, since callers are also moving in position within call queue 32 as calls are answered, the number of positions that an advancement token provides for adjustment may not be necessary for a particular call for that call to be the next in line. According to one advantage of the present invention, where the advancement token allows for a shift in positions that is greater than the shift needed, the extra shifting available may be transferred in the form of an extra token to one of token advancement systems 14 for storage in association with the caller. For future calls, the caller may access the extra token to advance the remaining positions.

The example of redeemed tokens illustrated within Table 3 represents one of multiple types of competitions as well as advancement tokens in general that may be redeemed. In the example, two callers at the competition system played a game to compete for a change in position where the winner increases one place in the queue and the loser decreases one place in the queue. In the example, call tracking number "1010" won the competition, and thus advanced a position within the call queue, while call tracking number "1012" lost the competition and thus moved back a position within the call queue.

Controller 30 preferably monitors the position of a call tracking number within call queue 32 after the call has been transferred to one of token advancement systems 14 or other services available to callers on hold. When a call is the next to be answered, controller 30 generates an indicator signal for transfer to the service system currently processing the call and network interface 34 transfers the signal to the service system. Calls may be delayed in return to ACD 12 if the caller wishes to continue participation in a particular service. In that case, controller 30 would delay that call within the queue and move to the next call to be answered.

According to another advantage of the present invention, in addition to monitoring the position of a call tracking number within call queue 32, controller 30 may perform analysis on the current flow of calls, the number of available representatives, the historical flow of calls, and other statistical data to estimate the wait time remaining for each call in the call queue 32. Queue data include, but not limited to, the number of people currently on hold, average time each caller is on hold, average time per call once connected with an attendant, the caller's position in the queue, and the caller's estimated hold time may be published to the caller as described in U.S. patent application Ser. No. 10/005,680. In particular, the queue data may be presented to the caller in an audio format over the phone or in a video format to a video phone, in which the caller would enter their requests via a keypad or through speech recognition. Alternatively, the queue data may be presented to the caller on a Web page that the caller can access with a call tracking number provided by ACD 12.

In the present invention, allowing callers to view estimated wait times and the position of other callers is particularly advantageous for the caller in selecting token advancement services and in monitoring actual progress in call queue 32 according to redemption of advancement tokens. In particular, where a caller chooses to redeem membership points for an advancement in position, it is advantageous for a caller to have an estimate of the number of positions needed to reach the top of call queue 32 or the estimated wait time until reaching the top of call queue 32.

Figure 3:
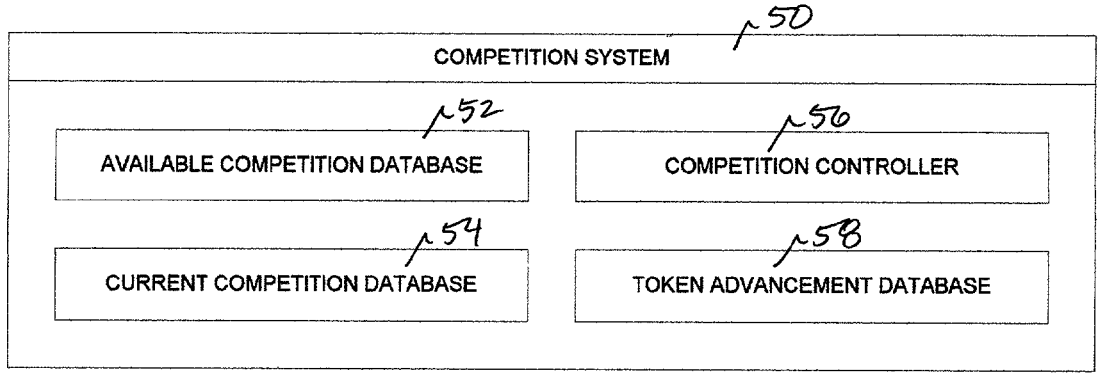
FIG. 3 depicts a block diagram of a competition system in accordance with the method, system, and program of the present invention.

With reference now to FIG. 3, there is depicted a block diagram of a competition system in accordance with the method, system, and program of the present invention. As illustrated, a competition system 50 includes multiple databases and a controller. While not depicted, the databases and controller may be communicatively connected via at least one bus and may include additional hardware and software devices, as will be understood by one skilled in the art of computing systems.

In particular, competition system 50 includes an available competition database 52, a current competition database 54, a token advancement database 58 and a competition controller 56. When a new call is received, competition controller 56 places a record of the call in current competition database 54 and offers the caller options for competition.

Advantageously, available competition database 52 includes at least one type of competition that is selectable by a caller. Competitions may be organized according to name, number, or other identifiers that are provided to the caller for selection via the IVRU of competition controller 56.

The content of competition may include, but is not limited to, trivia, gambling games, logic games, and other types of competition. A caller may choose to compete against the system, a set of selected callers, or a general audience of callers. Callers may compete for an increase or decrease in queue position. Further, callers may compete against each other for each other's queue positions. In order to compete in some competition options, competition controller 56 may enable callers to communicate with one another in order to agree on the promised result of a win or loss.

One example of a competition allows callers to participate in a variety show where a "host" reads questions that multiple callers can hear. The first caller to respond correctly to the question receives a particular number of points. In another example, two callers decide to play a card game against one another where the winner takes the better queue position from among the two callers.

Advantageously, competition play is limited by vendor constraints upon queue position adjustment. One vendor may limit callers to competition that allows increase in queue position by one place, while another vendor may limit callers to competition that allows increase in queue position by ten places. In addition, one vendor may allow callers to play any competition available from competition system 50, while another vendor may only allow callers to play competitions that last 5 minutes or more per competition. Alternatively, a vendor may request that points be accumulated for each caller according to wins and loses of competitions, where a particular number of points may be redeemed in an advancement token for a call queue position adjustment.

Depending on the competition option selected by each caller, competition controller 56 loads the selected competitions from available competition database 52 and controls play. Current competition database 54 holds each call and the competition currently selected for participation by each caller. Further, the results of the competition are stored in current competition database 54.

At the conclusion of each competition facilitated by competition controller 56, advancement tokens are compiled according to wins and loses. Preferably, the advancement token records are given a record number, the call tracking number, the type of competition, the adjustment promised, the result of the competition, the time granted, and other information that is required by ACD 12 for processing advancement tokens.

Figure 4:
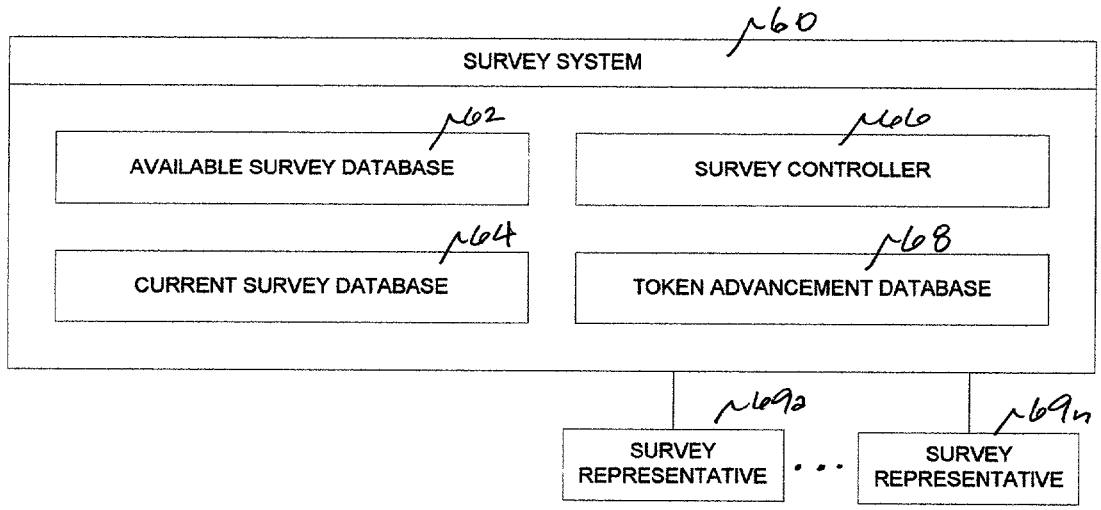
FIG. 4 illustrates a block diagram of a survey system in accordance with the method, system, and program of the present invention.

Referring now to FIG. 4, there is illustrated a block diagram of a survey system in accordance with the method, system, and program of the present invention. As illustrated, a survey system 60 includes multiple databases and a controller. While not depicted, the databases and controller may be communicatively connected via at least one bus and may include additional hardware and software devices, as will be understood by one skilled in the art of computing systems.

In particular, survey system 60 includes an available survey database 62, a current survey database 64, a survey controller 66, and a token advancement database 68. When a new call is received, survey controller 66 places a record of the call in current survey database 64 and offers survey options to the caller.

Advantageously, available survey database 62 includes at least one type of survey that is selectable by a caller. Surveys may be organized according to name, number, organization, or other identifiers that are output as selections to a caller by the IVRU of survey controller 66.

In general, available surveys are designed to gather consumer opinion. In particular, multiple types, lengths, and topics of survey options may be presented to a user. For example, a survey may include listening to an advertisement and responding to questions about the effectiveness of the advertising. In another example, multiple entities may provide surveys to be performed, where the entities pay a fee for each survey performed by a caller.

Surveys may be stored in multiple formats including, but not limited to, voice automated, text automated, HTML, and other available formats. Advantageously, where a caller has initiated a phone call from a web interface, the survey may be output to the web interface or to other output interface accessible to the caller. A caller may respond to the survey utilizing keypad and audio responses. A voice recognition system may be implemented to detect and translate audio responses.

Depending on the survey option selected by each caller, survey controller 66 loads the selected surveys from available competition database 62 and controls the selected survey event. Current survey database 64 holds each call and the survey currently selected for participation by each caller. Further, the results of the survey are stored in current survey database 64.

At the conclusion of each survey facilitated by survey controller 66, advancement tokens are compiled according to the type of survey. Preferably, the advancement token records are given a record number, the call tracking number, the type of survey, the adjustment promised, the time completed, and other information that is required by ACD 12 for processing advancement tokens.

According to one advantage of the present invention, the call may be forwarded from survey system 60 to one of survey representatives 69a–69n. Advantageously, survey representatives 69a–69n are terminals for communications with a pollster or other survey performer, such that the caller interacts with another person to complete the survey. In this case, current survey database 64 records the current location of the call at one of survey representatives 69a–69n and survey controller 66 controls the notification of the caller and the return of the call from one of survey representatives 69a–69n to the ACD when the call is next in line.

Figure 5:
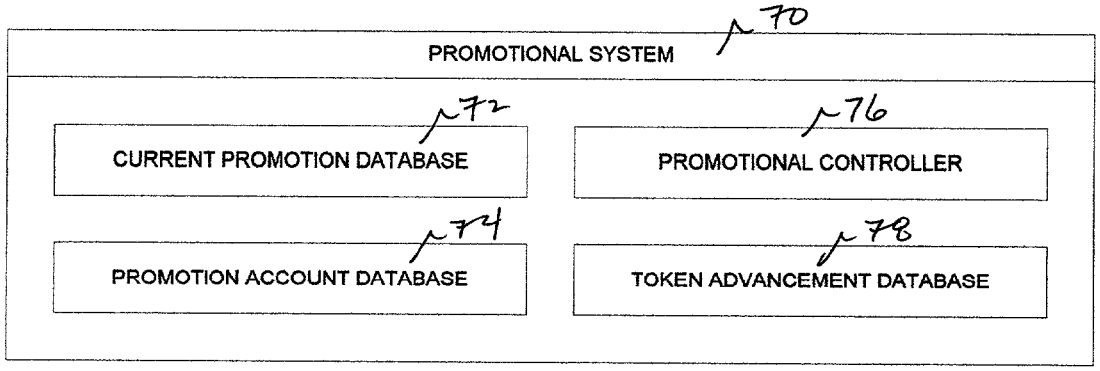
FIG. 5 depicts a block diagram of a promotion system in accordance with the method, system, and program of the present invention.

With reference now to FIG. 5, there is depicted a block diagram of a promotion system in accordance with the method, system, and program of the present invention. As illustrated, a promotion system 70 includes multiple databases and a controller. While not depicted, the databases and controller may be communicatively connected via at least one bus and may include additional hardware and software devices, as will be understood by one skilled in the art of computing systems.

In particular, promotional system 70 includes a current promotion database 72, a promotion account database 74, a promotional controller 76, and a token advancement database 78. When a new call is received, promotion controller 76 places a record of the call in current promotion database 62 and accesses the account specific for the caller from promotion account database 74.

According to one advantage of the present invention, a user may register with a vendor as part of a membership program or other promotional registration. The user is preferably provided with a user identification for accessing services provided by the vendor. The user may then gain points by winning contests, purchasing items, participating in surveys, and other interactions with a vendor. In particular, a web venue may provide the interface for a user to interact with a vendor, where points are added to a user's membership account according to the interactions.

Then, according to another advantage of the present invention, as a caller, the user may redeem the points stored in promotion account database 74 according to the user's membership program for advancement tokens. In particular, the amount of points in promotion account database 74 may be announced to the caller and the caller given the option of the number of positions that may be advanced for the number of points stored.

According to the number of positions selected by a caller for advancement, a point total within current promotion database 72 is reduced. Token advancement database 78 then records the number of points selected for redemption for an adjustment in position in the call queue. Promotional controller 76 then transfers the advancement token record to the ACD for adjustment of the caller's position within the queue.

Figure 6:
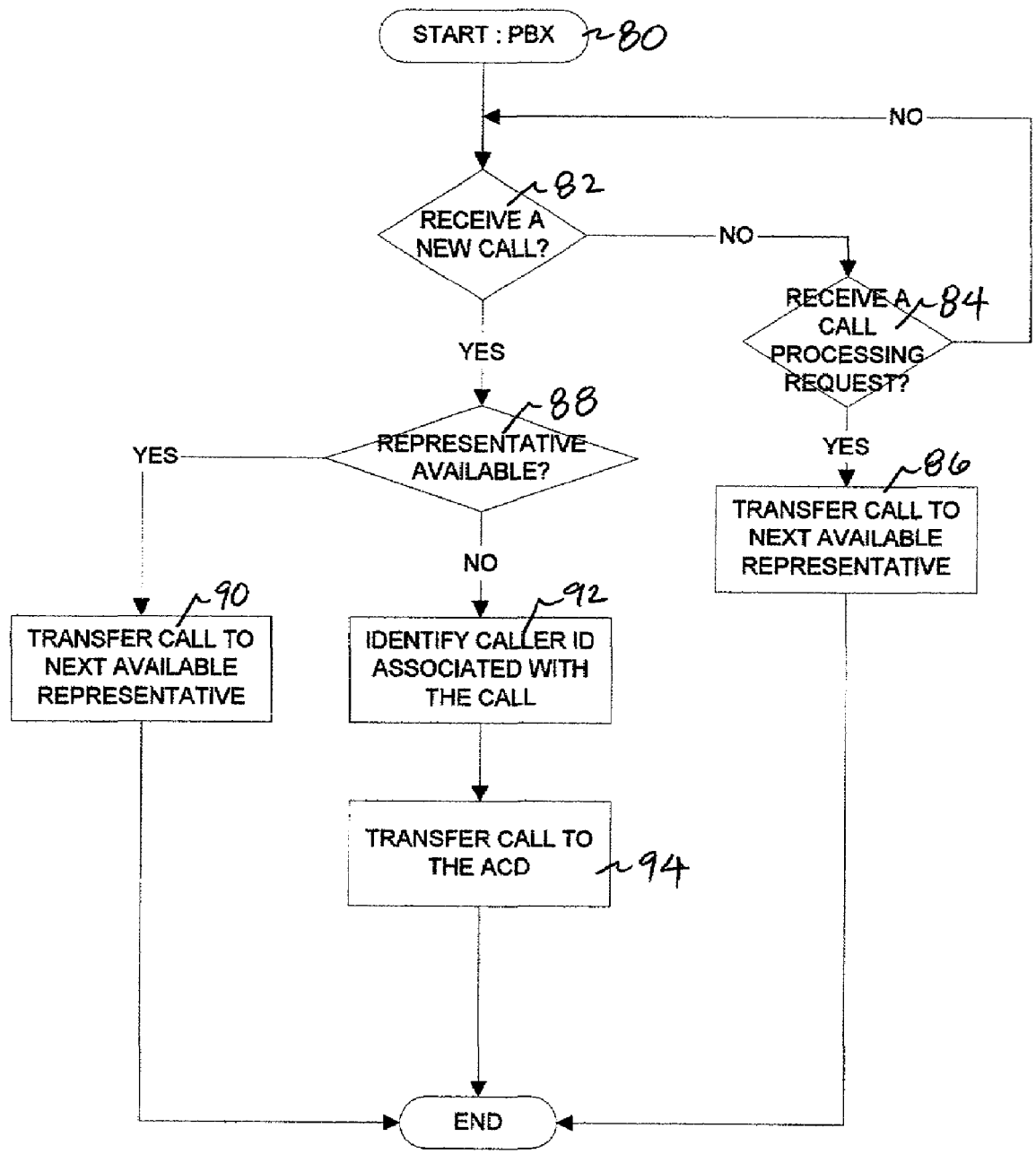
FIG. 6 illustrates a high level logic flowchart of a process and program for controlling a PBX system in accordance with the method, system, and program of the present invention.

Referring now to FIG. 6, there is illustrated a high level logic flowchart of a process and program for controlling a PBX system in accordance with the method, system, and program of the present invention. As depicted, the process starts at block 80 and thereafter proceeds to block 82.

Block 82 illustrates a determination as to whether or not a new call is received. If a new call is received, then the process passes to block 88. If a new call is not received, then the process passes to block 84.

Block 84 depicts a determination as to whether or not a call process request is received from an ACD. If a call processing request is not received, then the process passes to block 82. If a call processing request is received, then the process passes to block 86. Block 86 illustrates transferring the call to the next available representative, and the process ends.

Block 88 illustrates a determination as to whether or not a representative is available. If a representative is available, then the process passes to block 90. Block 90 depicts transferring the call to the next available representative, and the process ends. If a representative is not available, then the process passes to block 92.

Block 92 depicts identifying the caller ID associated with the call. Next, block 94 illustrated transferring the call to a call hold system, such as the ACD, and the process ends.

Figure 7:
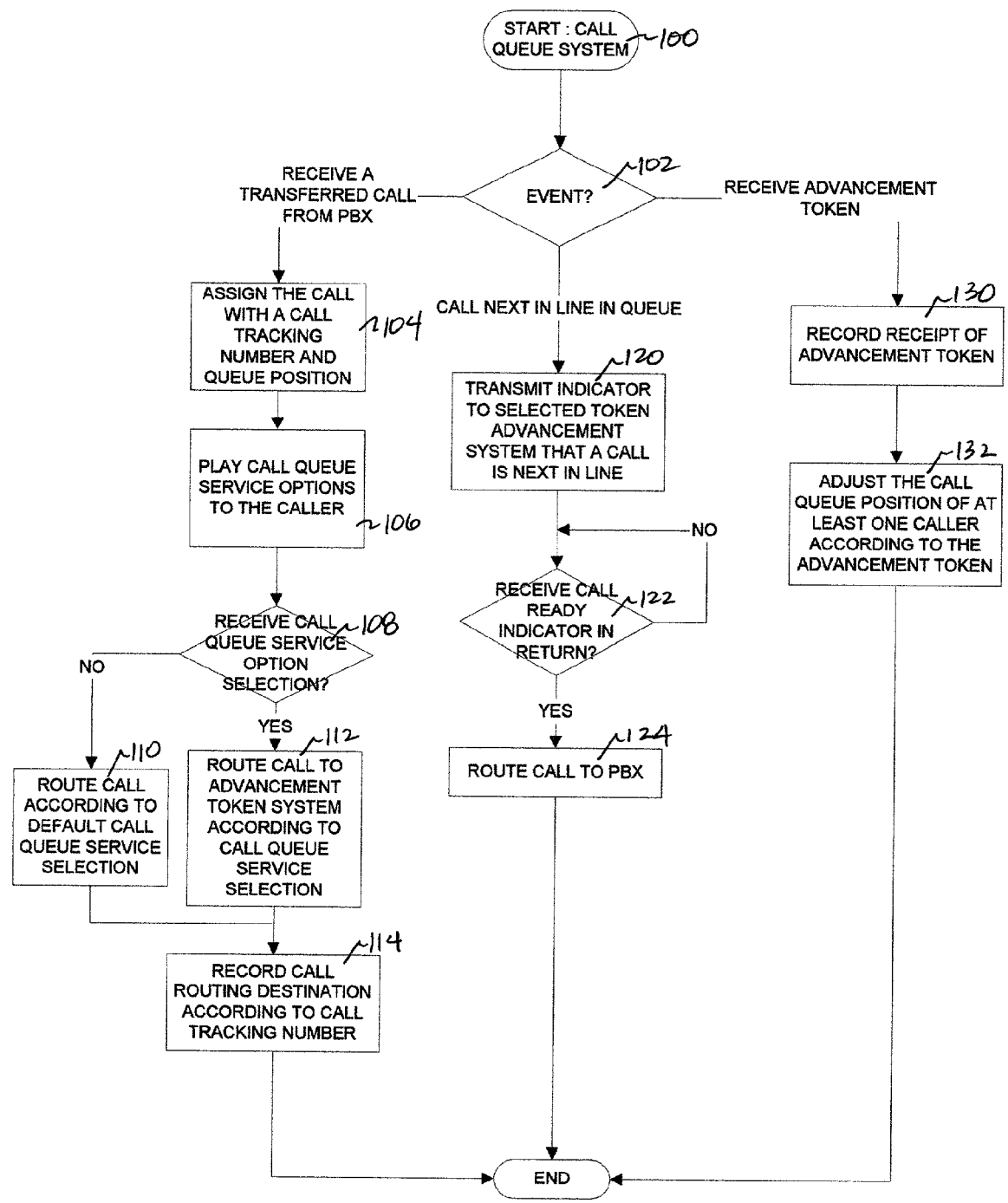
FIG. 7 depicts a high level logic flowchart of a process and program for controlling a call queue system in accordance with the method, system, and program of the present invention.

With reference now to FIG. 7, there is depicted a high level logic flowchart of a process and program for controlling a call queue system in accordance with the method, system, and program of the present invention. As illustrated, the process starts at block 100 and thereafter proceeds to block 102.

Block 102 illustrates a determination as to the event that has occurred. If the event is receipt of a transferred call from the PBX, then the process passes to block 104. If the event is that a call is positioned at the front of a queue and thus next in line to be answered, then the process passes to block 120. If the event is that an advancement token is received, then the process passes to block 130.

Block 104 depicts assigning the call with a call tracking number and a queue position. Next, block 106 illustrates playing call queue service options to the caller. Thereafter, block 108 depicts a determination as to whether or not a call queue option selection is received.

If a call queue option is not selected within a particular time period, then the call is routed according to a default option as depicted in block 110, and the process passes to block 114. If a call queue option is selection, then the process passes to block 112. Block 112 depicts routing the call to a token advancement server according to the call queue service option selected. Thereafter, block 114 illustrates recording the call routing destination according to the call tracking number, and the process ends.

Block 120 illustrates transmitting an indicator signal to the token advancement system holding the call that the next available representative will receive the call. Next, block 122 depicts a determination as to whether the caller has indicated a readiness for the call to be returned. If the caller has not indicated a readiness to return, then the process iterates at block 122. If the caller has indicated a readiness to return, then the process passes to block 124. Block 124 illustrates receiving the call from the token advancement system, routing the call to the PBX, and dropping the call from the call queue. Thereafter, and the process ends.

Block 130 depicts recording the receipt of an advancement token. Next, block 132 illustrates adjusting the call queue position of at least one caller according to the advancement token, and the process ends.

Figure 8:
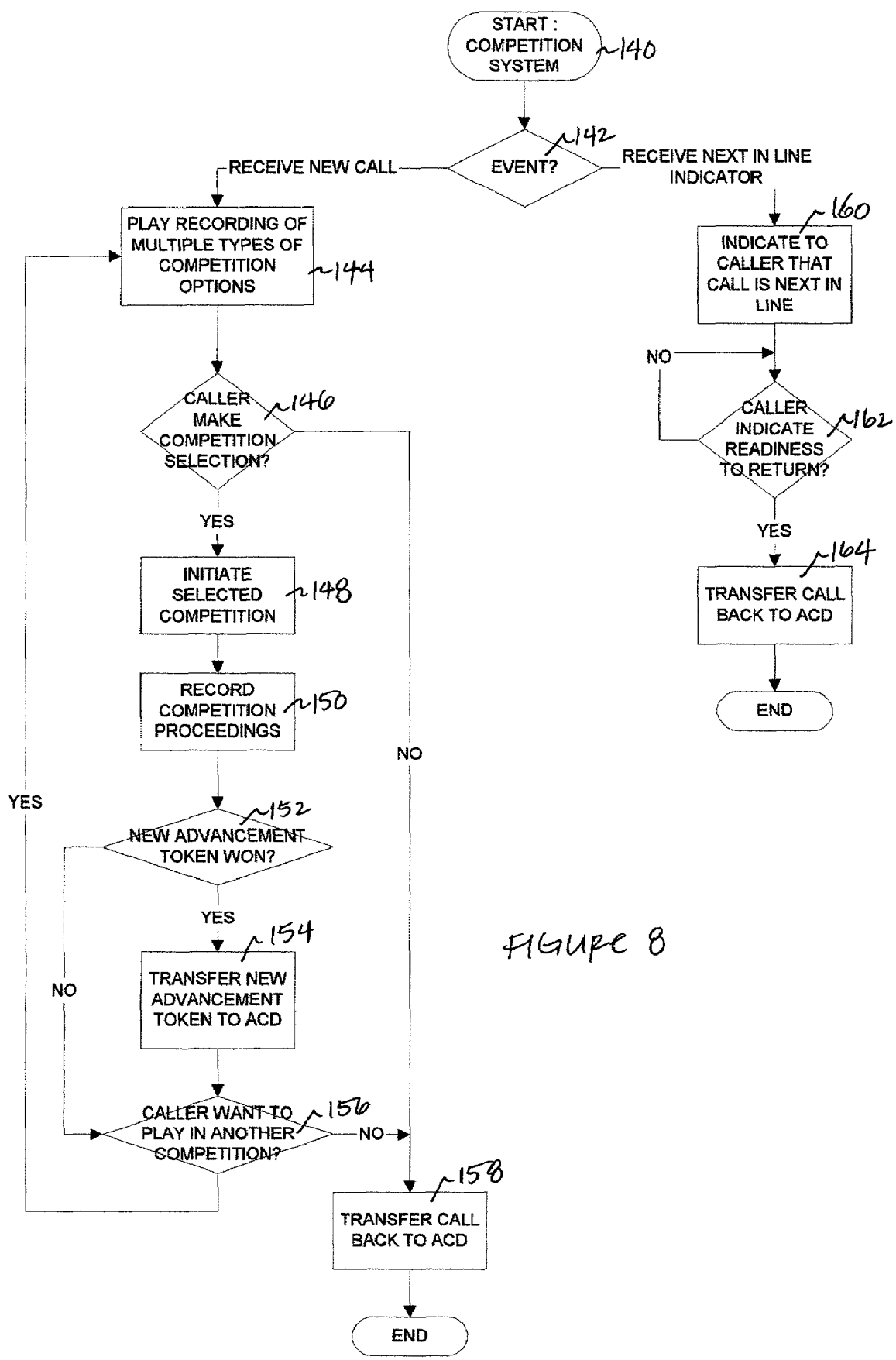
FIG. 8 illustrates a high level logic flowchart of a process and program for controlling a competition system in accordance with the method, system, and program of the present invention.

Referring now to FIG. 8, there is illustrated a high level logic flowchart of a process and program for controlling a competition system in accordance with the method, system, and program of the present invention. As depicted, the process starts at block 140 and thereafter proceeds to block 142.

Block 142 depicts a determination as to what type of event occurred when an event occurs. If a new call is received, then the process passes to block 144. If a next in line indicator is received, then the process passes to block 160.

Block 144 illustrates playing a recording of options for the multiple types of competition. Next, block 146 depicts a determination as to whether or not the caller makes a competition selection. If the caller makes a competition selection, then the process passes to block 148. If the caller does not make a competition selection, then the process passes to block 158. Block 158 depicts transferring the call back to the ACD, and the process ends.

Block 148 depicts initiating the competition selected by the caller. Next, block 150 illustrates recording the competition proceedings. Thereafter, block 152 depicts a determination as to whether or not an advancement token is won from the competition. If an advancement token is not won, then the process passes to block 156. If an advancement token is won, then the process passes to block 154. Block 154 illustrates transferring the new advancement token to the ACD, and the process passes to block 156.

Block 156 illustrates a determination as to whether or not the caller wants to participate in another competition. The caller may provide a keypad or voice input to indicate whether or not the caller wants to continue participation. If the caller wants to participate in another competition, then the process passes to block 144. If the caller does not want to participate in another competition, then the process passes to block 158, where the call is transferred back to the ACD, and the process ends.

Block 160 depicts indicating to the caller that the call is next in line. An audio or text prompt may be utilized to notify the caller of being next in line. Next, block 162 illustrates a determination as to whether or not the caller has indicated a readiness to return to the ACD for the call to be answered. If the call does not indicated a readiness to return, then the process iterates at block 162. If the caller indicates a readiness to return, then the process passes to block 164. Block 164 depicts transferring the call back to the call queue, and the process ends.

Figure 9:
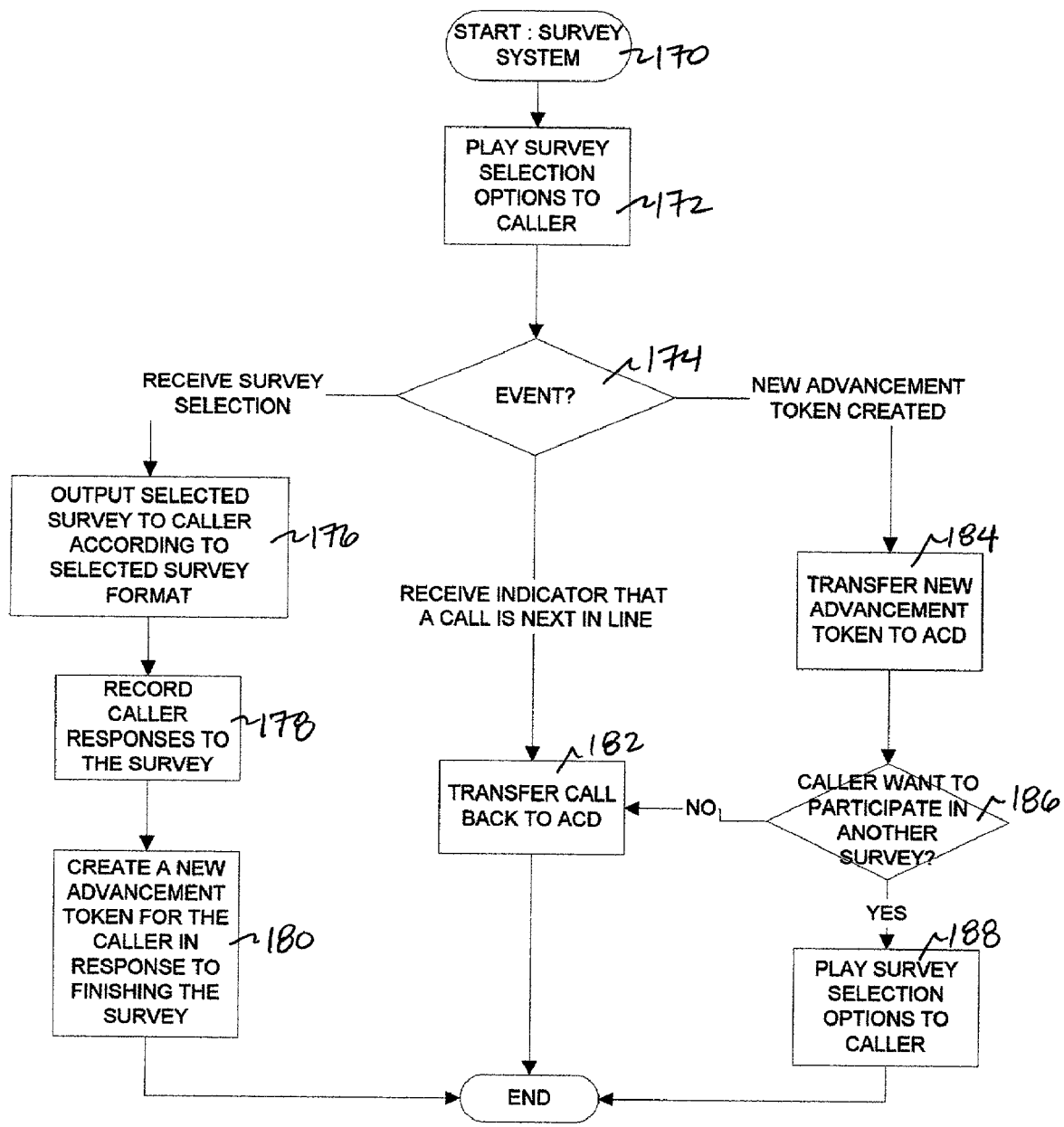
FIG. 9 depicts a high level logic flowchart of a process and program for controlling a survey system in accordance with the method, system, and program of the present invention.

With reference now to FIG. 9, there is depicted a high level logic flowchart of a process and program for controlling a survey system in accordance with the method, system, and program of the present invention. As illustrated, the process starts at block 170 and thereafter proceeds to block 172.

Block 172 depicts playing the survey selection options to the caller. Next, block 174 illustrates a determination as to the type of event that occurred when an event occurs. If a survey selection is received, then the process passes to block 176. If an indicator that the call is next in line is received, then the process passes to block 182. If a new advancement token is created, then the process passes to block 184.

Block 176 depicts outputting the selected survey to the caller according to the survey format. Outputting the selected survey may include transferring the survey to a web interface accessible to the caller or transferring the call to a survey representative. Next, block 178 illustrates recording the caller responses to the survey. Thereafter, block 180 depicts creating a new advancement token for the caller in response to the caller finishing the survey, and the process ends.

Block 184 illustrates transferring the advancement token to the ACD. Next, block 186 depicts a determination as to whether or not the caller wants to participate in another survey. If the caller does not want to participate in another survey, then the process passes to block 182. If the caller does want to participate in another survey, then the process passes to block 188. Block 188 illustrates playing the survey selection options to the caller, and the process ends.

Block 182 depicts transferring the call back to the call queue, and the process ends. The caller may also be given the option of completing the survey before returning to the call to the ACD.

Figure 10:
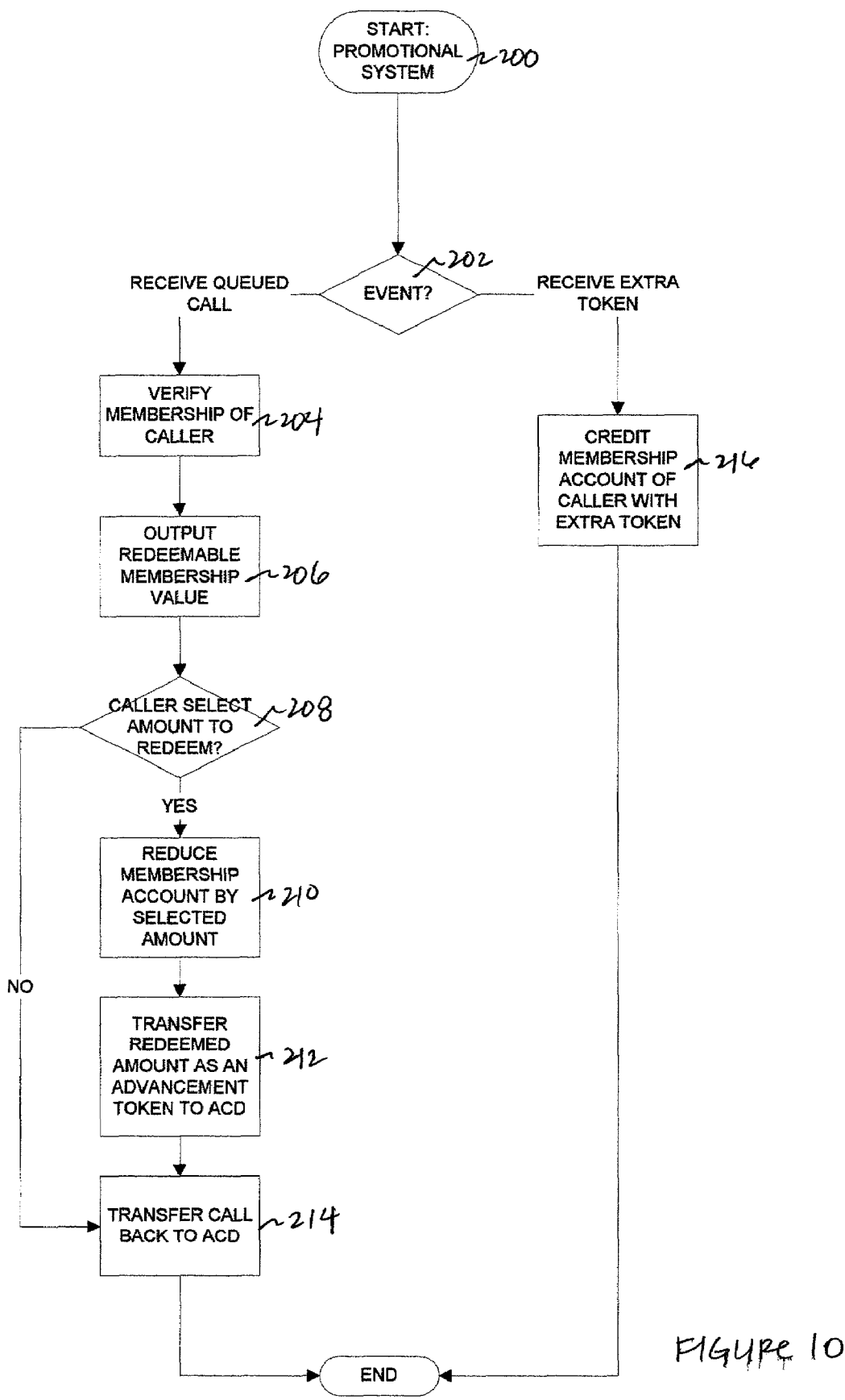
FIG. 10 illustrates a high level logic flowchart of a process and program for controlling a promotional system in accordance with the method, system, and program of the present invention.

Referring now to FIG. 10, there is illustrated a high level logic flowchart of a process and program for controlling a promotional system in accordance with the method, system, and program of the present invention. As depicted, the process starts at block 200 and thereafter proceeds to block 202.

Block 202 depicts a determination as to the type of event that occurred when an event occurs. If a queued call is received, then the process passes to block 204. If an extra token is received, then the process passes to block 216.

Block 204 illustrates verifying the membership of the caller. Next, block 206 depicts outputting the redeemable membership point value to the caller. The redeemable membership point value may be output to the caller via an audio or text message, or may be displayed on a display monitor accessible to the caller. Preferably, the ratio for points to queue position adjustment is indicated to the caller as well.

Next, block 208 illustrates a determination as to whether the caller selects an amount to redeem. If the caller does not select an amount to redeem, then the process passes to block 214. Block 214 depicts transferring the call back to the ACD, and the process ends. If the caller selects an amount to redeem, then the process passes to block 210.

Block 210 depicts reducing the membership account for the caller by the selected amount. Next, block 212 illustrates transferring the redeemed amount as an advancement token to the ACD, and the process passes to block 214.

Block 216 illustrates crediting the membership account of the caller with the extra token, and the process ends. In particular, when a caller requests to purchase an advancement token with membership points, not all of the advancement in position may be needed when the call returns to the ACD. The ACD preferably only uses the portion of the advancement token needed to advance the caller to the desired queue position and then returns to the remaining portion of the advancement token as an extra token that may be credited back in the form of points to the caller's membership account.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for caller position adjustment within a calling queue comprising:
   receiving a call from a caller at a call center;
   placing said call on hold in a calling queue of said call center, wherein said calling queue maintains an order in which calls are answered by representatives;
   responsive to a selection of a position adjustment option by said caller while waiting on hold, transferring said call to a token advancement system while maintaining a record of said call that advances in said calling queue, wherein said token advancement system is accessible to a plurality of separate call centers via a network, wherein said token advancement system specifies for each of said plurality of separate call centers a separate selection of options from among a plurality of options for enabling said caller to earn an advancement token;
   responsive to detecting, at said calling queue, said advancement token earned by a caller from said token advancement system, calculating a separate redemption value of said advancement token specifically for adjustment of position within said calling queue; and
   responsive to calculating said redemption value of said advancement token, adjusting a position of said caller according to said redemption value within said calling queue, such that said caller is allowed control over said position within said calling queue.

2. The method for caller position adjustment within a calling queue according to claim 1, wherein detecting said advancement token further comprises:
   detecting said advancement token earned by a caller by participating in at least one from among a competition, a survey, and a redemption of membership points during a prior call made before a current call by said caller positioned in said calling queue.

3. The method for caller position adjustment within a calling queue according to claim 1, wherein detecting said advancement token further comprises:
   detecting said advancement token from said token advancement system communicatively connected to said calling queue.

4. The method for caller position adjustment within a calling queue according to claim 1, wherein adjusting said position further comprises:
adjusting said position of a call within said calling queue while said call is located at said token advancement system.

5. The method for caller position adjustment within a calling queue according to claim 1, further comprising:
detecting when said caller is next in line to be answered within said calling queue; and
transferring a next in line notification to said caller at said token advancement system.

6. The method for caller position adjustment within a calling queue according to claim 1, further comprising:
returning an unused portion of said advancement token to a promotion system for storage in association with said caller.

7. The method for caller position adjustment within a calling queue according to claim 1, wherein adjusting said position further comprises:
advancing said call a particular number of positions within said calling queue.

8. The method for caller position adjustment within a calling queue according to claim 1, wherein adjusting said position further comprises:
advancing said call a particular amount of wait time within said calling queue.

9. A system for caller position adjustment within a calling queue comprising:
a calling queue for holding a call from a caller received at a call center;
means for placing said call on hold in a calling queue of said call center, wherein said calling queue maintains an order in which calls are answered by representatives;
means, responsive to a selection of a position adjustment option by said caller while waiting on hold, for transferring said call from said calling queue to a token advancement system while maintaining a record of said call that advances in said calling queue, wherein said token advancement system is accessible to a plurality of separate call centers via a network, wherein said token advancement system specifies for each of said plurality of separate call centers a separate selection of options from among a plurality of options for enabling said caller to earn an advancement token;
means, responsive to detecting said advancement token at said calling queue, wherein said advancement token is earned by a caller from said token advancement system, for calculating a separate redemption value of said advancement token specifically for adjustment of position within said calling queue; and
means, responsive to calculating said redemption value of said advancement token, for adjusting a position of said caller according to said redemption value within said calling queue.

10. The system for caller position adjustment within a calling queue according to claim 9, wherein said means for detecting an advancement token further comprises:
means for detecting said advancement token earned by a caller by participating in at least one from among a competition, a survey, and a redemption of membership points during a prior call made before a current call by said caller position in said calling queue.

11. The system for caller position adjustment within a calling queue according to claim 9, wherein said means for detecting said advancement token further comprises:
means for detecting said advancement token from said token advancement system communicatively connected to said calling queue.

12. The system for caller position adjustment within a calling queue according to claim 9, wherein said means for adjusting said position further comprises:
means for adjusting said position of a call within said calling queue while said call is located at said token advancement system.

13. The system for caller position adjustment within a calling queue according to claim 9, further comprising:
means for detecting when said caller is next in line to be answered within said calling queue; and
means for transferring a next in line notification to said caller at said token advancement system.

14. The system for caller position adjustment within a calling queue according to claim 9, further comprising:
means for returning an unused portion of said advancement token to a promotion system for storage in association with said caller.

15. The system for caller position adjustment within a calling queue according to claim 9, wherein said means for adjusting said position further comprises:
means for advancing said call a particular number of positions within said calling queue.

16. The system for caller position adjustment within a calling queue according to claim 9, wherein said means for adjusting said position further comprises:
means for advancing said call a particular amount of wait time within said calling queue.

17. A computer program product for caller position adjustment within a calling queue comprising:
a recording medium;
means, recorded on said recording medium, for placing a call received at a call center on hold in a calling queue of said call center, wherein said calling queue maintains an order in which calls are answered by representatives;
means, recorded on said recording medium, responsive to a selection of a position adjustment option by said caller while waiting on hold, for transferring said call from said calling queue to a token advancement system while maintaining a record of said call that advances in said calling queue, wherein said token advancement system is accessible to a plurality of separate call centers via a network, wherein said token advancement system specifies for each of said plurality of separate call centers a separate selection of options from among a plurality of options for enabling said caller to earn an advancement token;
means, recorded on said recording medium, responsive to detecting said advancement token at said calling queue, wherein said advancement token is earned by a caller from said token advancement system, for calculating a separate redemption value of said advancement token specifically for adjustment of position within said calling queue; and
means, recorded on said recording medium, for adjusting a position of said caller according to said redemption value of said advancement token within said calling queue.

18. The computer program product for caller position adjustment within a calling queue according to claim 17, wherein said means for detecting an advancement token further comprises:
means, recorded on said recording medium, for detecting said advancement token earned by a caller by participating in at least one from among a competition, a survey, and a redemption of membership points during a prior call made before a current call by said caller position in said calling queue.

19. The computer program product for caller position adjustment within a calling queue according to claim 17, wherein said means for detecting said advancement token further comprises:
   means, recorded on said recording medium, for detecting said advancement token from said token advancement system communicatively connected to said calling queue.

20. The computer program product for caller position adjustment within a calling queue according to claim 17, wherein said means for adjusting said position further comprises:
   means, recorded on said recording medium, for adjusting said position of a call within said calling queue while said call is located at said token advancement system.

21. The computer program product for caller position adjustment within a calling queue according to claim 17, further comprising:
   means, recorded on said recording medium, for detecting when said caller is next in line to be answered within said calling queue; and
   means, recorded on said recording medium, for enabling transfer of a next in line notification to said caller at said token advancement system.

22. The computer program product for caller position adjustment within a calling queue according to claim 17, further comprising:
   means, recorded on said recording medium, for returning an unused portion of said advancement token to a promotion system for storage in association with said caller.

23. The computer program product for caller position adjustment within a calling queue according to claim 17, wherein said means for adjusting said position further comprises:
   means, recorded on said recording medium, for advancing said call a particular number of positions within said calling queue.

24. The computer program product for caller position adjustment within a calling queue according to claim 17, wherein said means for adjusting said position further comprises:
   means, recorded on said recording medium, for advancing said call a particular amount of wait time within said calling queue.

25. A method for earning an adjustment in a position within a call hold queue, comprising:
   receiving, at a token advancement system, at least one call transferred from a particular call hold queue from among a plurality of separate call hold queues, wherein said token advancement system specifies a separate selection of position adjustment service options for calls received from each of said separate call hold queues;
   enabling a caller of said at least one call to participate in at least one position adjustment service selected by said caller from among a particular selection of position adjustment service options specified for calls received from said particular call hold queue; and
   responsive to a result of said caller participation in said at least one position adjustment service, transferring a token for directing adjustment of a position of one from among said at least one call and a future call within said call hold queue.

26. The method for earning an adjustment according to claim 25, wherein receiving at least one call further comprises:
   receiving said at least one call transferred from said particular call hold queue from among said plurality of separate call hold queues each representative of a separate one from among a plurality of vendors.

27. The method for earning an adjustment according to claim 25, wherein enabling a caller further comprises:
   enabling said caller to participate in a competition for adjustment of a position within said call hold queue;
   monitoring said result of said competition, wherein said result comprises whether said caller wins or loses said competition; and
   creating said token indicating said win or lose for directing adjustment of said position.

28. The method for earning an adjustment according to claim 27, wherein enabling said caller further comprises:
   enabling said caller to participate in said competition, wherein options for competitors of said competition comprise at least one from among a general audience of callers, a selected set of callers, a single other caller, and a computer system.

29. The method for earning an adjustment according to claim 27, wherein enabling said caller further comprises:
   enabling said caller to participate in said competition, wherein options for types of said competition comprise at least one from among a trivia game, a card game, logic game, and a word game.

30. The method for earning an adjustment according to claim 25, wherein enabling a caller further comprises:
   enabling said caller to participate in a survey for earning said token for adjustment of a position within said call hold queue;
   monitoring said result of said survey, wherein said result comprises whether said caller completes said survey; and
   creating said token indicating a position adjustment promised for participation in said survey.

31. The method for earning an adjustment according to claim 30, wherein enabling said caller further comprises:
   transferring said call to a survey interaction system, wherein said call is answered by a survey representative at said survey interaction system.

32. The method for earning an adjustment according to claim 30, wherein enabling said caller further comprises:
   transferring said survey to said caller via an output interface accessible to said caller.

33. The method for earning an adjustment according to claim 25, wherein enabling a caller further comprises:
   enabling said caller to designate a portion of a membership account value to be applied to an adjustment of said position of said call;
   monitoring said result of said designation, wherein said result comprises an adjustment redemption for said portion of said membership account value.

34. The method for earning an adjustment according to claim 33, further comprising:
   enabling said caller to add to said membership account value by participating in promotional activities at a time at least one from among before said call is placed and after said call is placed.

35. The method for earning an adjustment according to claim 25, wherein transferring a token further comprises:
   transferring said token to said call hold queue while maintaining said call at said token advancement system.

36. The method for earning an adjustment according to claim 25, further comprising:
  receiving an indicator that said call is next to be answered; and
  alerting said caller of said indicator.

37. A system for earning an adjustment in a position within a call hold queue, comprising:
  a token advancement system for receiving a call transferred from a particular call hold queue from among a plurality of separate call hold queues, wherein said token advancement system specifies a separate selection of position adjustment service options for calls received from each of said separate call hold queues;
  means for enabling a caller of said call to participate in at least one position adjustment service selected by said caller from among a particular selection of position adjustment service options specified for calls received from said particular call hold queue; and
  means responsive to a result of said caller participation in said at least one position adjustment service, for transferring a token for directing adjustment of a position of one from among said call and a future call by said caller within said call hold queue.

38. The system for earning an adjustment according to claim 37, wherein said token advancement system receives said at least one call from said particular call hold queue from among said plurality of separate call hold queues each representative of a separate one from among a plurality of vendors.

39. The system for earning an adjustment according to claim 37, wherein said means for enabling a caller further comprises:
  means for enabling said caller to participate in a competition for adjustment of a position within said call hold queue;
  means for monitoring said result of said competition, wherein said result comprises whether said caller wins or loses said competition; and
  means for creating said token indicating said win or lose for directing adjustment of said position.

40. The system for earning an adjustment according to claim 39, wherein said means for enabling said caller further comprises:
  means for enabling said caller to participate in said competition, wherein options for competitors of said competition comprise at least one from among a general audience of callers, a selected set of callers, a single other caller, and a computer system.

41. The system for earning an adjustment according to claim 39, wherein said means for enabling said caller further comprises:
  means for enabling said caller to participate in said competition, wherein options for types of said competition comprise at least one from among a trivia game, a card game, logic game, and a word game.

42. The system for earning an adjustment according to claim 37, wherein said means for enabling a caller further comprises:
  means for enabling said caller to participate in a survey for earning said token for adjustment of a position within said call hold queue;
  means for monitoring said result of said survey, wherein said result comprises whether said caller completes said survey; and
  means for creating said token indicating a position adjustment promised for participation in said survey.

43. The system for earning an adjustment according to claim 42, wherein said means for enabling said caller further comprises:
  means for transferring said call to a survey interaction system, wherein said call is answered by a survey representative at said survey interaction system.

44. The system for earning an adjustment according to claim 42, wherein said means for enabling said caller further comprises:
  means for transferring said survey to said caller via an output interface accessible to said caller.

45. The system for earning an adjustment according to claim 37, wherein said means for enabling a caller further comprises:
  means for enabling said caller to designate a portion of a membership account value to be applied to an adjustment of said position of said call;
  means for monitoring said result of said designation, wherein said result comprises an adjustment redemption for said portion of said membership account value.

46. The system for earning an adjustment according to claim 45, further comprising:
  means for enabling said caller to add to said membership account value by participating in promotional activities at a time at least one from among before said call is placed and after said call is placed.

47. The system for earning an adjustment according to claim 37, wherein said means for transferring a token further comprises:
  means for transferring said token to said call hold queue while maintaining said call at said token advancement system.

48. The system for earning an adjustment according to claim 37, further comprising:
  means for receiving an indicator that said call is next to be answered; and
  means for alerting said caller of said indicator, wherein said caller is provided with an option to return to said call hold queue.

49. A computer program product for earning an adjustment in a position within a call hold queue, said computer program product comprising:
  a recording medium;
  means, recorded on said recording medium, for receiving at least one call transferred from a particular call hold queue from among a plurality of separate call hold queues;
  means, recorded on said recording medium, for enabling a caller of said at least one call to participate in at least one position adjustment service selected by said caller from among a particular selection of position adjustment service options specified for calls received from said particular call hold queue, wherein a separate selection of position adjustment service options are specified for calls received from each of said separate call hold queues; and
  means, recorded on said recording medium, for enabling transfer of a token reflective of said caller participation for directing adjustment of a position of one from among said at least one call and a future call by said caller within a call hold queue.

50. The computer program product for earning an adjustment according to claim 49, wherein said means for enabling a caller further comprises:
  means, recorded on said recording medium, for enabling said caller to participate in a competition for adjustment of a position within said call hold queue;

means, recorded on said recording medium, for monitoring said result of said competition, wherein said result comprises whether said caller wins or loses said competition; and means, recorded on said recording medium, for creating said token indicating said win or lose for directing adjustment of said position.

51. The computer program product for earning an adjustment according to claim 49, wherein said means for enabling a caller further comprises:

means, recorded on said recording medium, for enabling said caller to participate in a survey for earning said token for adjustment of a position within said call hold queue;

means, recorded on said recording medium, for monitoring said result of said survey, wherein said result comprises whether said caller completes said survey; and means, recorded on said recording medium, for creating said token indicating a position adjustment promised for participation in said survey.

52. The computer program product for earning an adjustment according to claim 49, wherein said means for enabling a caller further comprises:

means, recorded on said recording medium, for enabling said caller to designate a portion of a membership account value to be applied to an adjustment of said position of said call;

means, recorded on said recording medium, for monitoring said result of said designation, wherein said result comprises an adjustment redemption for said portion of said membership account value.

53. The computer program product for earning an adjustment according to claim 49, wherein said means for enabling transfer of a token further comprises:

means, recorded on said recording medium, for enabling transfer of said token to said call hold queue while maintaining said call at a token advancement system.

* * * * *